United States Patent
Sherback et al.

(10) Patent No.: US 6,996,313 B1
(45) Date of Patent: Feb. 7, 2006

(54) LASER COMPONENT SYSTEM ASSEMBLY

(75) Inventors: Mike Sherback, North Easton, MA (US); Edward C. Vail, Menlo Park, CA (US)

(73) Assignee: Santur Corporation, Fremont, CA (US)

( * ) Notice: Subject to any disclaimer, the term of this patent is extended or adjusted under 35 U.S.C. 154(b) by 154 days.

(21) Appl. No.: 10/629,505

(22) Filed: Jul. 29, 2003

Related U.S. Application Data

(60) Provisional application No. 60/400,029, filed on Jul. 30, 2002.

(51) Int. Cl.
*G02B 6/42* (2006.01)

(52) U.S. Cl. .......................... 385/52; 385/88
(58) Field of Classification Search ................. 385/52, 385/88–94, 134
See application file for complete search history.

(56) References Cited

U.S. PATENT DOCUMENTS

| | | | |
|---|---|---|---|
| 4,703,176 A | 10/1987 | Hahn et al. | |
| 4,895,425 A | 1/1990 | Iwano et al. | |
| 5,313,269 A | 5/1994 | Ponce et al. | |
| 5,600,747 A | 2/1997 | Yamakawa et al. | |
| 6,370,290 B1 | 4/2002 | Ball et al. | |
| 6,473,553 B1 * | 10/2002 | Jerman et al. | 385/137 |
| 2002/0064192 A1 | 5/2002 | Missey et al. | |

FOREIGN PATENT DOCUMENTS

| | | |
|---|---|---|
| WO | WO 02/13343 A2 | 2/2002 |
| WO | WO 02/013343 A3 | 7/2003 |

* cited by examiner

*Primary Examiner*—Sarah Song
(74) *Attorney, Agent, or Firm*—Christie, Parker & Hale, LLP

(57) ABSTRACT

An optical subassembly (OSA) with components including a microelectromechanical structure (MEMS) is formed with a jig. The jig includes a jig clamp and a jig stencil and allows for the optical components of the OSA to be optically aligned to one another using passive alignment. The jig stencil includes openings for the optical components and have an edge with a retractable portion that urge the optical components into position. The optical components are fixed in position by soldering, and the retractable portions allow for the jig stencil to move relative to the fixed components to avoid misalignment of the OSA components during cooling. The MEMS is then adjusted to maximize optical power directed from a light source, through the optical components, and into an optical transmission medium.

28 Claims, 12 Drawing Sheets

LASER COMPONENT SYSTEM ASSEMBLY

CROSS-REFERENCE TO RELATED APPLICATION(S)

This application claims the benefit of U.S. Provisional Application Ser. No. 60/400,029 entitled Laser Component System Assembly, filed Jul. 30, 2002, the contents of which are hereby incorporated by reference.

BACKGROUND OF THE INVENTION

The present invention relates generally to optical devices and more particularly to fiber optic packages and methods for assembling the same.

Optical packages and assemblies, particularly those with single mode fiber couplings, generally require careful placement of components within the package to ensure proper alignment between the optical fiber and the various optical components including the optical source, to ensure a sufficient amount of light entering the optical fiber. Fiber optic packages with single mode fiber couplings are typically assembled to meet sizing and alignment tolerances, some on the order of tenths of a micron. Generally, active alignment techniques are required to meet such tight alignment tolerances. In active alignment, a light emitting device such as a laser is active, i.e., emitting light, when the other optical components are positioned and re-positioned with respect to the light emitting device. A sensing or receiving element must be monitored and the components may be re-positioned based on the sensed/received light. Active alignment techniques therefore require considerable time and manpower. Active alignment is used to align the light emitting source to the other optical components to form an optical subassembly (OSA) and also to align the light emitting device and the OSA to the optical fiber or other optical transmission or receiving medium. Depending on the application and number of functions of the package, multiple active alignment steps may be required to produce a package of an OSA coupled to an optical transmission medium.

Passive alignment techniques, in contrast, involve the placement and alignment of optical components without the active emitting device emitting light. For passive alignment, mechanical guides and the like may be used or the components may simply be affixed to pre-determined positions. The passive alignment process is much simpler, quicker and less work-intensive, but the tradeoff is that poorer alignment is achieved and tight alignment tolerances generally are not achieved using conventional techniques.

It would therefore be desirable to align optical components using passive alignment techniques while satisfying the tight alignment tolerances required in today's optoelectronics industry.

SUMMARY OF THE INVENTION

An aspect of the invention provides methods for optically coupling optical components, and the optical subassemblies and packages formed using such methods.

In one exemplary embodiment, an aspect of the invention provides a method for optically coupling optical components that comprises providing a base substrate and a plurality of optical components including a light source and an adjustable optical element. The method includes forming an optical subassembly by passively aligning the plurality of optical components including the light source, using a jig, and joining the optical components to the base substrate. The optical subassembly is passively aligned to an optical transmission medium and the adjustable optical element is adjusted such that the optical power of light emitted by the light source and directed into the optical transmission medium, is maximized.

In another exemplary embodiment, an aspect of the invention provides a method for optically coupling optical components. The method includes providing a base substrate, a plurality of optical components including a light source, and a jig. The jig is positioned over the base substrate. The plurality of optical components are aligned using the jig such that the light source is optically aligned to the other optical components using passive alignment. A solder layer is formed between each of the optical components and the base substrate. The optical components are joined to the base substrate such that the light source remains optically aligned to the other optical components to form an optical subassembly (OSA).

In another exemplary embodiment, a method for optically coupling optical components is provided. The method includes providing a jig, a base substrate, and a plurality of optical components including a light source, and forming an optical subassembly by passively aligning the plurality of optical components using only the jig and joining the optical components to the base substrate such that the optical components satisfy an alignment tolerance of +/−5 microns.

In another exemplary embodiment, an aspect of the invention provides an apparatus comprising a jig stencil having a plurality of openings that receive a corresponding plurality of optical components and passively align the optical components to one another such that they are optically aligned. In one embodiment, the optical components satisfy an alignment tolerance of plus/minus 5 microns. At least one of the jig stencil openings includes a border having a retractable portion that is movable with respect to the jig stencil and contacts the corresponding optical component received within the opening.

In another exemplary embodiment, an aspect of the invention provides an alignment jig, an optical subassembly including a light source and a plurality of optical components including a microelectromechanical structure (MEMS) component, and an optical transmission medium. The plurality of optical components and the optical subassembly are arranged such that light emitted by the optical source is directed to the optical transmission medium by the plurality of optical components and the optical subassembly includes alignment tolerances obtainable with the alignment jig of the present invention.

In another exemplary embodiment, an aspect of the invention provides an optical subassembly comprising a plurality of optical components including a light source and an adjustable microelectromechanical structure and satisfying an alignment tolerance of +/−5 microns, the plurality of optical components optically aligned to one another using only a jig.

In another exemplary embodiment, an aspect of the invention provides an optical subassembly comprising a plurality of optical components including a light source and an adjustable microelectromechanical structure and satisfying an alignment tolerance of +/−5 microns, the plurality of optical components optically passively aligned to one another using a jig.

In still another exemplary embodiment, an aspect of the invention provides an apparatus comprising an optical transmission medium and an optical subassembly having optical components including a light source and an adjustable microelectromechanical structure, the optical components aligned to one another using only a jig and configured such that the amount of light from the optical source that enters the optical transmission medium is maximized.

In yet another exemplary embodiment, an aspect of the invention provides an apparatus comprising an optical transmission medium and an optical subassembly having optical components including a light source and an adjustable microelectromechanical structure, the optical components passively aligned to one another using a jig and configured such that the amount of light from the optical source that enters the optical transmission medium, is maximized.

BRIEF DESCRIPTION OF THE DRAWINGS

The following invention is best understood from the following detailed description when read in conjunction with the accompanying drawing. It is emphasized that, according to common practice, the various features of the drawing are not necessarily to scale. On the contrary, the dimensions of the various features are arbitrarily expanded or reduced for clarity. Like numerals denote like features throughout the specification and drawing. Included are the following figures.

DETAILED DESCRIPTION

Figure 1:
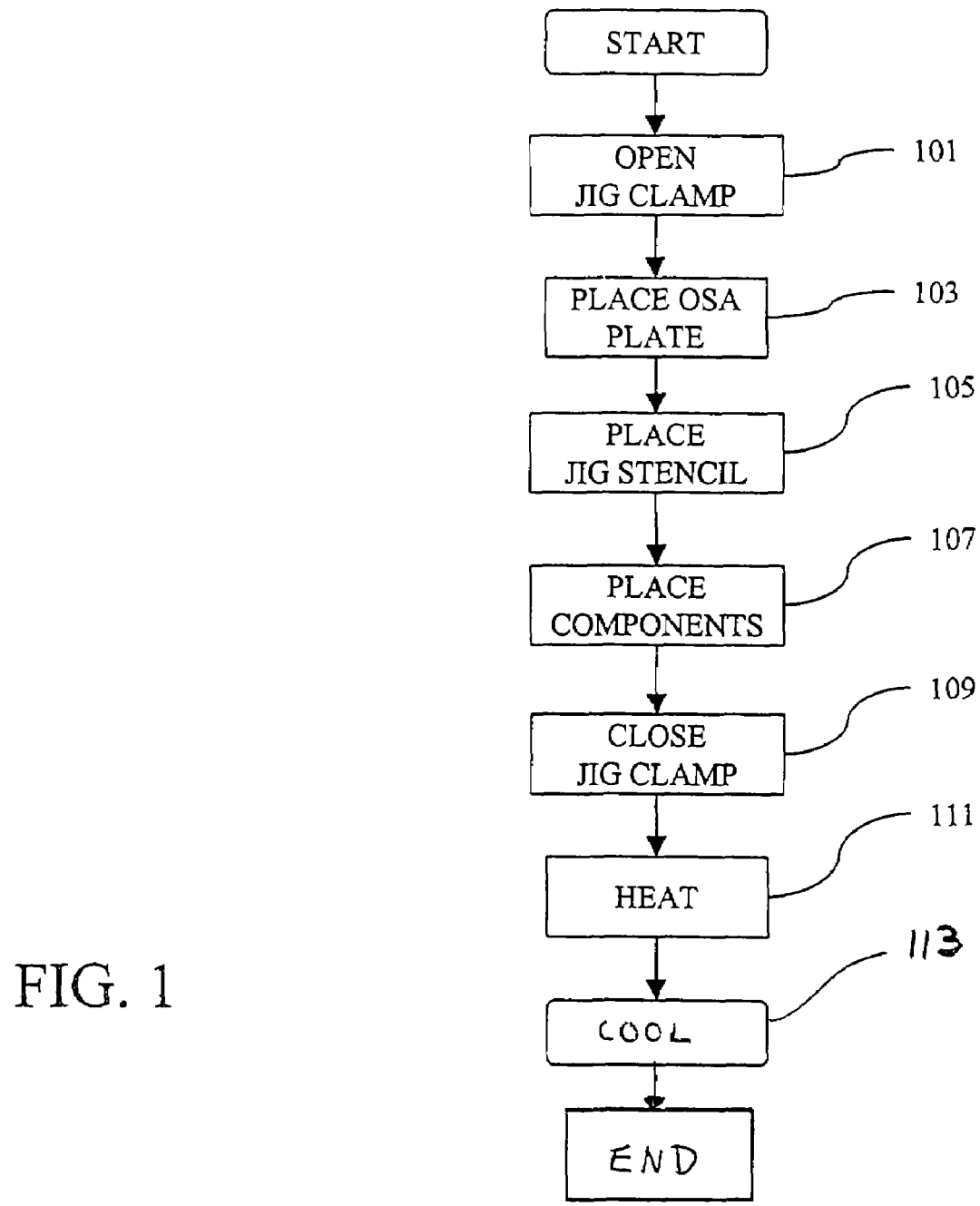
FIG. 1 is a flow diagram of an embodiment of a laser component system assembly method.

An aspect of the invention provides an optical subassembly including a light source, and a method for assembling the same using passive alignment techniques. The optical components that form the optical subassembly (OSA) include an adjustable microelectromechanical structure (MEMS) and are aligned to a sufficiently tight alignment tolerance such that no active alignment is required in constructing the OSA, and such that the OSA may subsequently be passively aligned to an optical fiber or other optical transmission medium to form a useable optical package, i.e. a package in which a sufficient amount of light emitted by the light source and directed through the optical components, reaches the optical transmission medium. Stated alternatively, the optical components are optically aligned. A jig, which may include a jig stencil and jig clamp, is used to passively align the optical components of the optical subassembly. The MEMS of the OSA which is passively aligned to the optical transmission medium, may be adjusted such that light emitted by the light source and directed through the optical components, achieves a maximum optical power at the optical transmission medium.

The jig stencil is used to position and passively align the optical components. A retractable member that forms part of the border of at least one of the jig stencil openings, is used to urge the components into alignment position and to prevent the optical components from becoming misaligned during the heating and cooling processes used to join the optical components to a base. In this manner, the jig does not geometrically interfere with the aligned optical components as the assembly cools. The retractable members allow the jig to move relative to the optical components during heating and cooling operations. Jamming of the optical components is prevented and the optical components remain fixed in position and in alignment.

The time and effort to actively align the components is thereby obviated. Alternatively, the need for the precision and stability of an active alignment step which often induces significant unwanted movements that reduce coupling efficiency and require undesirable corrective work, is deemed unnecessary. The functional fiber-coupled package therefore includes alignment tolerances obtainable using the jig of the present invention.

After the optical components of the OSA are passively aligned to one another and to an optical transmission medium such as an optical fiber, the controllable MEMS structure may then be adjusted to correct for imperfections in the bonding process used to physically join the optical fiber to the OSA, for example. The MEMS adjustment optimizes alignment and coupling efficiency and maximizes the amount of light from the light source that reaches the optical fiber. In this manner, the fiber coupled package uses the MEMS to optimize fiber coupling.

To summarize, the jig provides for passively aligning the optical components of the OSA to a sufficiently tight alignment tolerance that enables the OSA to be passively coupled to an optical fiber to form a functional device and such that a subsequent MEMS adjustment can maximize the optical power at the optical fiber coupling. Such an accurate alignment is often especially critical in single-mode optical fiber coupling.

Now turning to the figures, FIG. 1 is a schematic illustrating one embodiment of the laser component system assembly method. In block 101, a jig clamp is opened to receive an OSA plate. The OSA plate is placed on the jig clamp at block 103. In block 105, a jig stencil is placed over the OSA plate and in block 107 the optical components are placed within the openings of the jig stencil to contact solder which may be formed on the OSA plate or between the OSA plate and the components. The jig clamp is closed in block 109 and in block 111, the assembly is heated to join the components. In block 113, the components are cooled and remain within the specified alignment tolerance.

Figure 2:
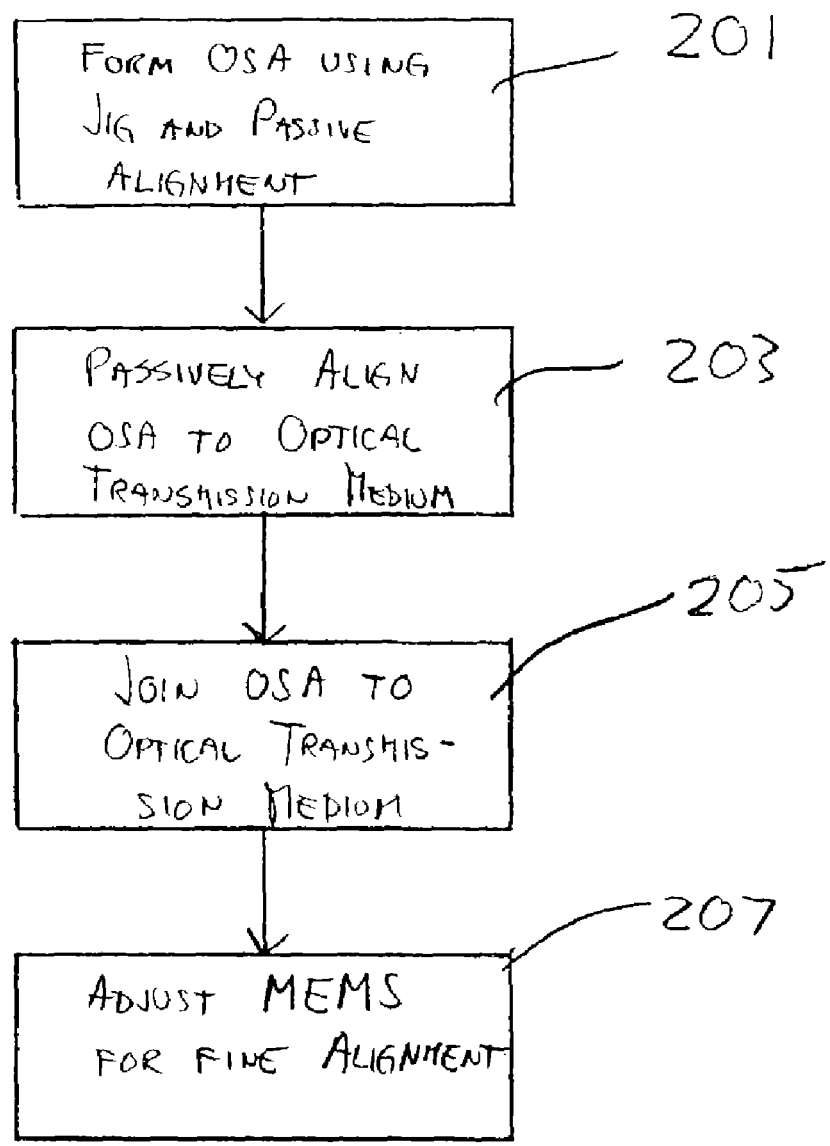
FIG. 2 is a flow diagram of an embodiment of a method for laser component system assembly including fine alignment.

FIG. 2 is a schematic illustrating an embodiment of the laser component system assembly method including fine alignment. In block 201, an OSA is formed using a jig and passive alignment. In block 203, the OSA is passively aligned to an optical transmission medium and in block 205 the OSA is joined, i.e., physically coupled, to the optical transmission medium. In block 207, a MEMS included in the OSA is adjusted for fine alignment of the OSA to the optical transmission medium.

The following figures are useful in illustrating the aforementioned methods.

Figure 3:
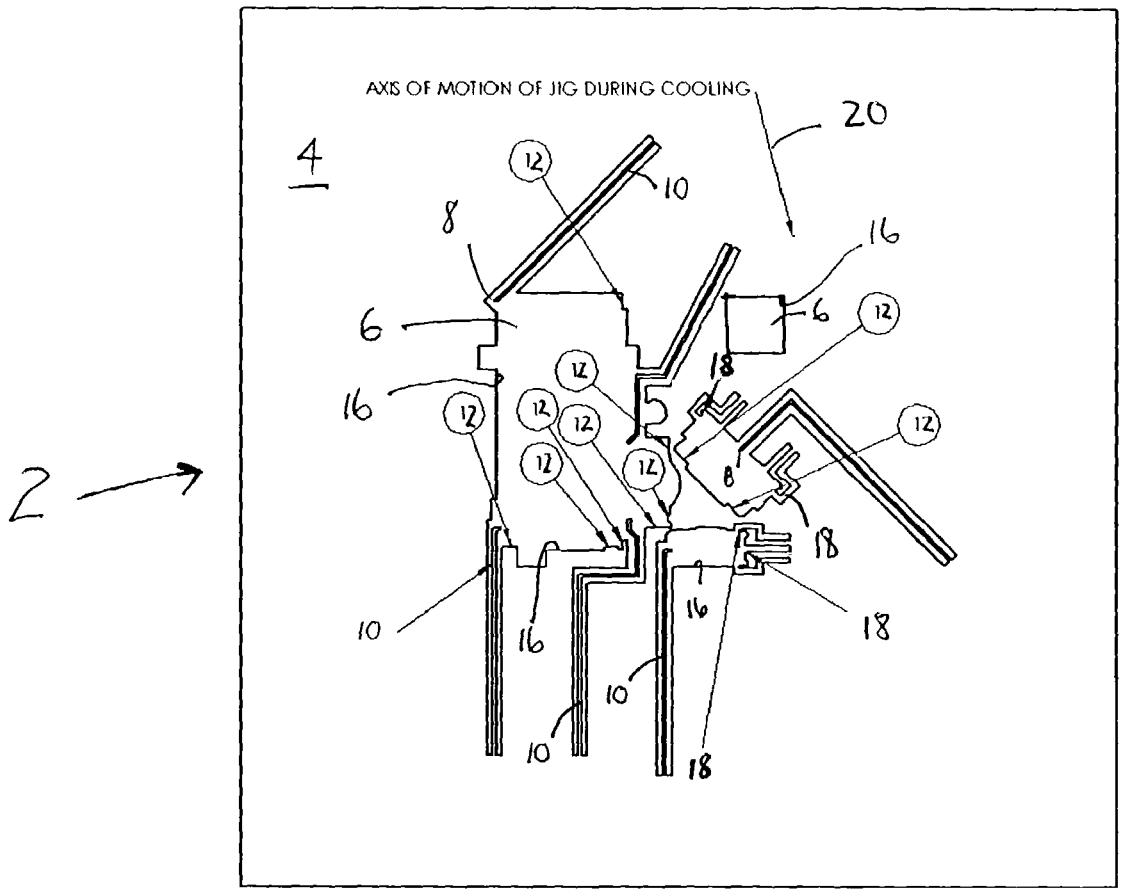
FIG. 3 is a plan view of an exemplary jig stencil.

FIG. 3 is a plan view of an exemplary jig stencil. The jig stencil is generally placed over the OSA base and includes openings used to position, i.e., passively align, the optical components laterally with respect to one another. Jig stencil 2 may be precision machined and may be formed of stainless steel, kovar, or other material to achieve critical alignment tolerances. In one exemplary embodiment, 420 alloy stainless steel may be used. Jig stencil 2 may be manufactured using EDM, electron discharge machining, and may be sized to satisfy an alignment tolerance of +/−5 $\mu$m or less. The jig stencil may produce an OSA with optically aligned components that satisfy alignment tolerances of +/−5 $\mu$m, +/−10 $\mu$m or +/−15 $\mu$m, for example.

Jig stencil 2 is generally planar and includes surface 4. Extending through jig stencil 2 are a plurality of openings 6 for receiving optical components (not shown in FIG. 3) and for passively aligning the optical components to one another. Jig stencil 2 includes a thickness sufficient to accommodate the optical components it will receive. Openings 6 are generally bound by edges 16. Also forming part of the border of openings 6 are retractable portions 8, which are movable with respect to the rest of jig stencil 2. Retractable portions 8 form the ends of beams 10 and are resilient members that resiliently urge the components into position within openings 6. Retractable portions 8 are discontinuous with the rest of the edge that defines and bounds openings 6. Retractable portions 8 each include a surface that contacts the component positioned within opening 6 and beams 10 act as springs to secure the components in position. Compliant reference surfaces 18 also aid in positioning the respective components within openings 6. Jig stencil 2 also includes a plurality of reference surfaces 12. Reference surfaces 12 also position the optical components within openings 6 and will be discussed below in further detail. The combination of reference surfaces 12, compliant reference surfaces 18 and retractable portions 8 prevents the aligned optical components from becoming misaligned or jamming due to thermal mismatch when the optical components and jig cool after being heated such as during soldering. During cooling, reference surfaces 12 move along the direction of axis of motion 20, as will be described further below.

Figure 4:
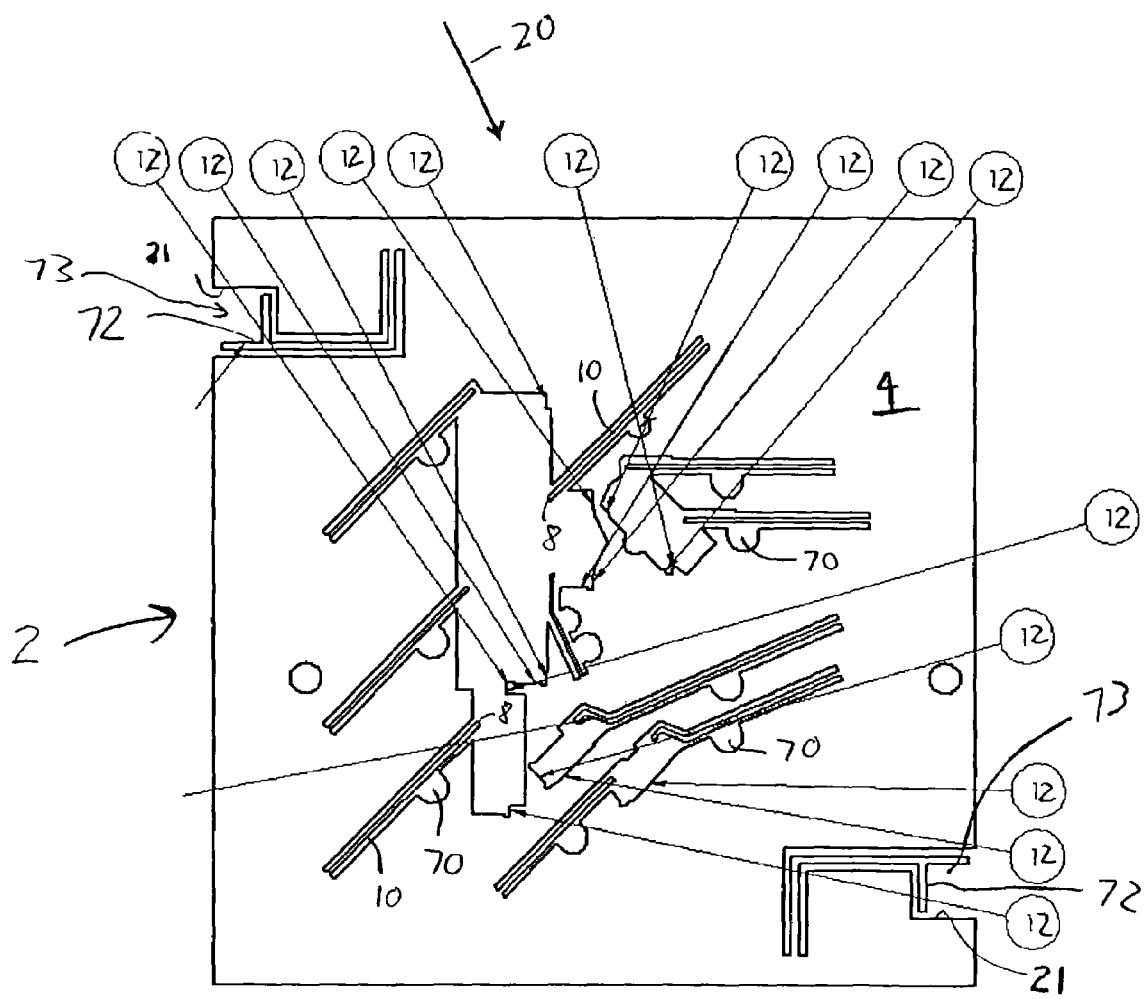
FIG. 4 is a plan view of another exemplary jig stencil.

FIG. 4 is a plan view of another exemplary jig stencil 2. In addition to the aforementioned features described in conjunction with FIG. 3, the exemplary jig stencil 2 shown in FIG. 4 also includes compliant jig-to-base alignment features 73 which include openings 21 which are at least partially bounded by retractable members 72. These alignment features may be used to receive a protuberance formed on a jig base, for example, as will be shown in FIG. 7. Jig stencil 2 also includes holes 70 which are shown in further detail in FIG. 5.

Figure 5:
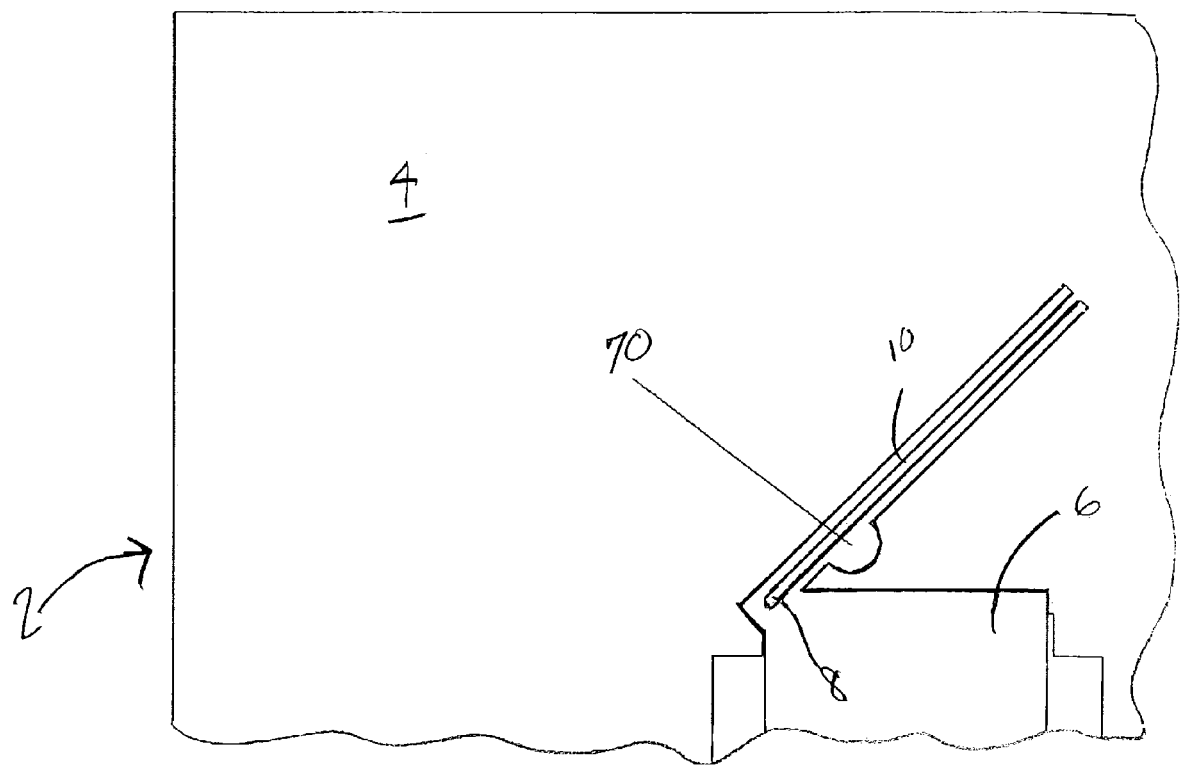
FIG. 5 is a plan view showing an exemplary retractable spring for positioning an optical component within a jig stencil opening.

FIG. 5 illustrates another aspect of the jig stencil of present invention. Jig stencil 2 includes hole 70 formed adjacent beam 10. A dowel or other mechanical member may be inserted within hole 70 to laterally displace beam 10 and cause retractable portion 8 to be retracted from opening 6, enabling an optical component to be positioned within opening 6, for example. After the part is inserted within opening 6, the dowel or other mechanical member may be removed so that retractable portion 8 and beam 10 return to the position illustrated in FIG. 5 and urge the optical component into alignment position.

Figure 6:
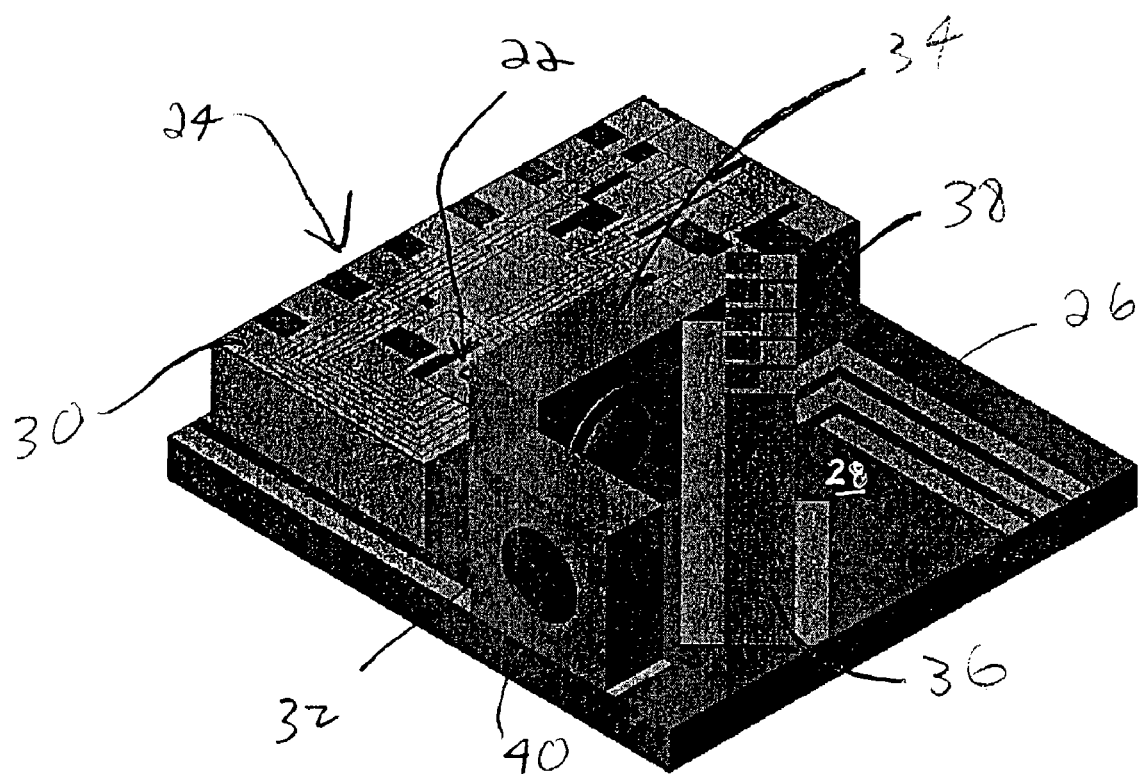
FIG. 6 is a perspective view of an exemplary optical subassembly.

FIG. 6 is a perspective view of an exemplary OSA that may be formed by the passive alignment method of the present invention. OSA 24 includes OSA base 26. Joined to surface 28 of OSA base 26 are exemplary optical components submount 30 including laser chip 22 (barely visible), collimating lens 34, MEMS 36 and coupling/focusing lens 32. Laser chip 22 is clearly illustrated in FIG. 12. This arrangement is intended to be exemplary only and various other arrangements of the illustrated optical components may be used. In other exemplary embodiments, various other combinations of optical components may also be used to form OSAs. Additional monitoring or detecting components may also be included in various exemplary embodiments. Laser chip 22 includes a laser which serves as the light source and emits a light beam that is generally orthogonal to surface 38 and is generally directed toward collimating lens 34. Various lasers may be used and the lasers may emit light of various wavelengths.

According to the illustrated arrangement, the emitted light is collimated by passing through collimating lens 34 and directed by MEMS 36 through coupling/focusing lens 32 so that a light beam exits the OSA as an optical output at location 40, and may be coupled to an optical transmission medium such as an optical fiber (not shown) or other external optical transmission or receiving element. In one exemplary embodiment, MEMS 36 may be an adjustable and controllable mirror. According to this exemplary embodiment, the position of the MEMS mirror is adjustable. In other exemplary embodiments, MEMS 36 may be various other structures that can be mechanically adjusted to direct the emitted light beam as desired. The arrangement of the optical train is intended to be exemplary only. Because of the tight alignment tolerances achieved in the passively aligned OSA 24 using the jig of the present invention, and because of the adjustable optical component (MEMS 36), OSA 24 may be passively aligned to an optical fiber, or other optical transmission medium or optical receiver.

Figure 7:
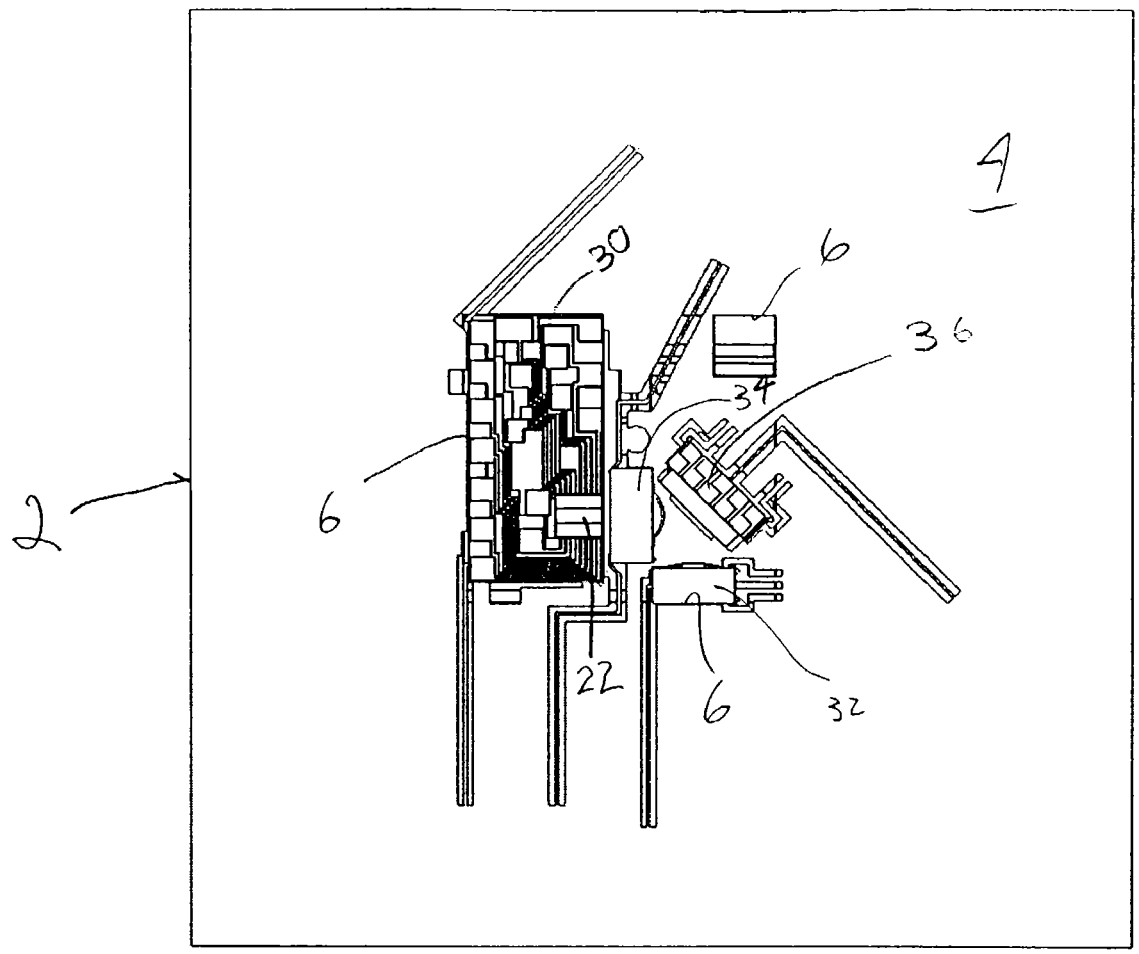
FIG. 7 is a plan view of an exemplary jig stencil loaded with optical components.

FIG. 7 is a plan view showing a plurality of optical components positioned within corresponding openings 6 of jig stencil 2. In the illustrated embodiment, submount 30 with laser chip 22, collimating lens 34, MEMS 36, and coupling/focusing lens 32 are positioned within a corresponding opening 6.

Figure 8:
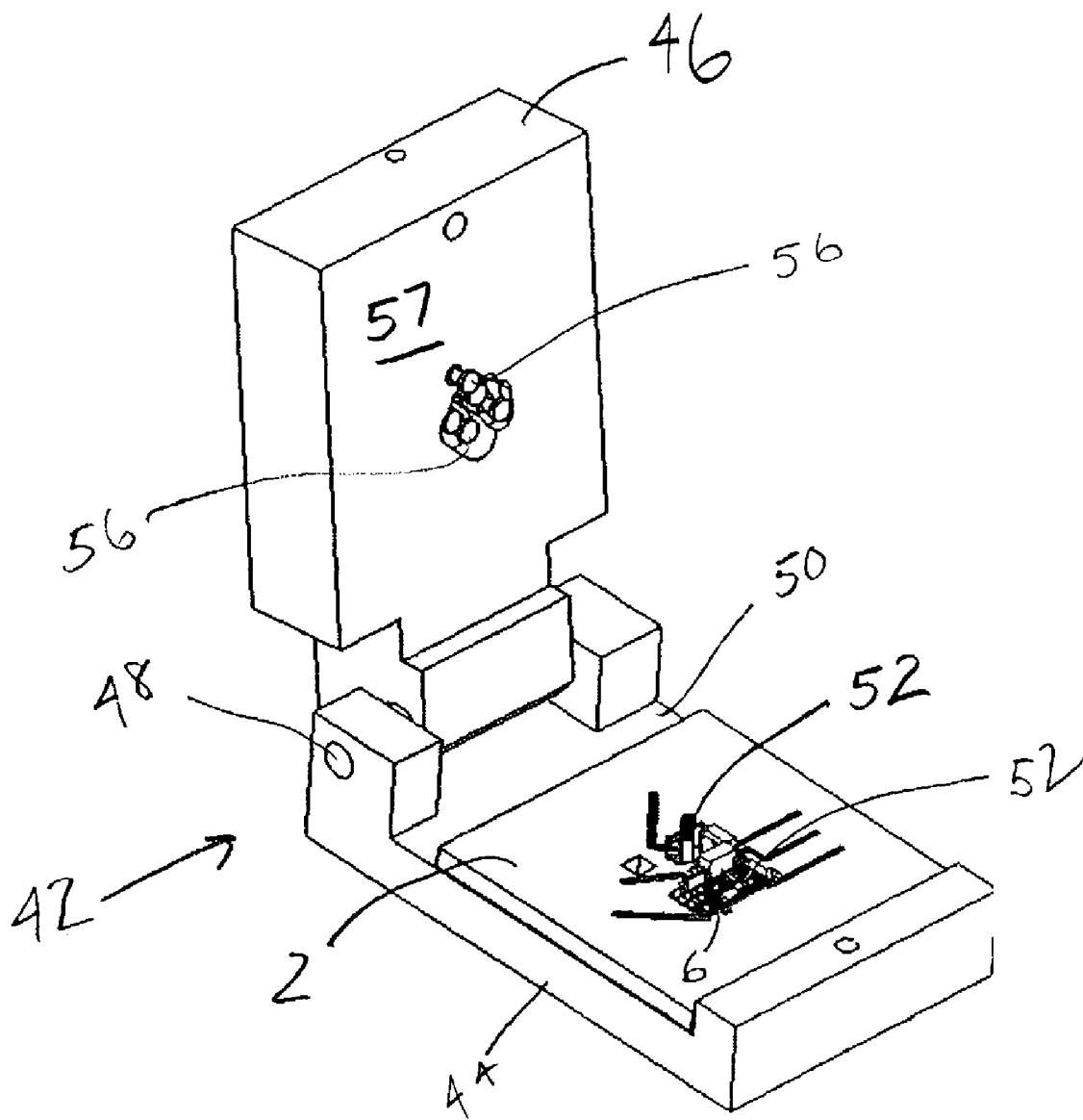
FIG. 8 is a perspective view of a laser component system assembly including an exemplary jig clamp, jig stencil and optical subassembly.

FIG. 8 illustrates an exemplary jig used for passively aligning the optical components to form OSA 24. The jig illustrated in FIG. 8 includes a jig clamp and jig stencil. Jig clamp 42 includes clamp base 44 and clamp cover 46 and is illustrated in open position for receiving the OSA base and components. Clamp cover 46 is coupled to, and movable with respect to, clamp base 44. In the illustrated embodiment, clamp cover 46 is hinged about pivot point 48 and pivots with respect to clamp base 44. Clamp cover 46 includes facing surface 57 and clamp base 44 includes surface 50. This arrangement is intended to be exemplary only.

In an exemplary embodiment, OSA 24 may be formed by placing OSA base 26 on or over surface 50 of clamp base 44. OSA base 26 is obscured by jig stencil 2 and therefore not visible in FIG. 8. Jig stencil 2 is then positioned over OSA base 26. The components are positioned within openings 6 of jig stencil 2 as shown in the plan view of FIG. 7 and as will be discussed in further detail below. OSA base 26 and jig stencil 2 may be positioned manually in one embodiment and in another embodiment, they may be positioned using automated machinery. OSA base 26 may be positioned on clamp base 44 using various mechanical alignment features, such as grooves or other recesses, in conjunction with ribs or other protuberances. Similarly, jig stencil 2 may be positioned/aligned with respect to clamp base 44 and OSA base 26 using pins, ribs or other mechanical protrusions that are received in corresponding recesses, such as a groove, in clamp base 44. An exemplary rib 62/recess 64 arrangement will be shown in the cross-sectional perspective view of FIG. 10, which also shows a recessed lip 66 formed within clamp base 44 for receiving and positioning OSA base 26.

Figure 9:
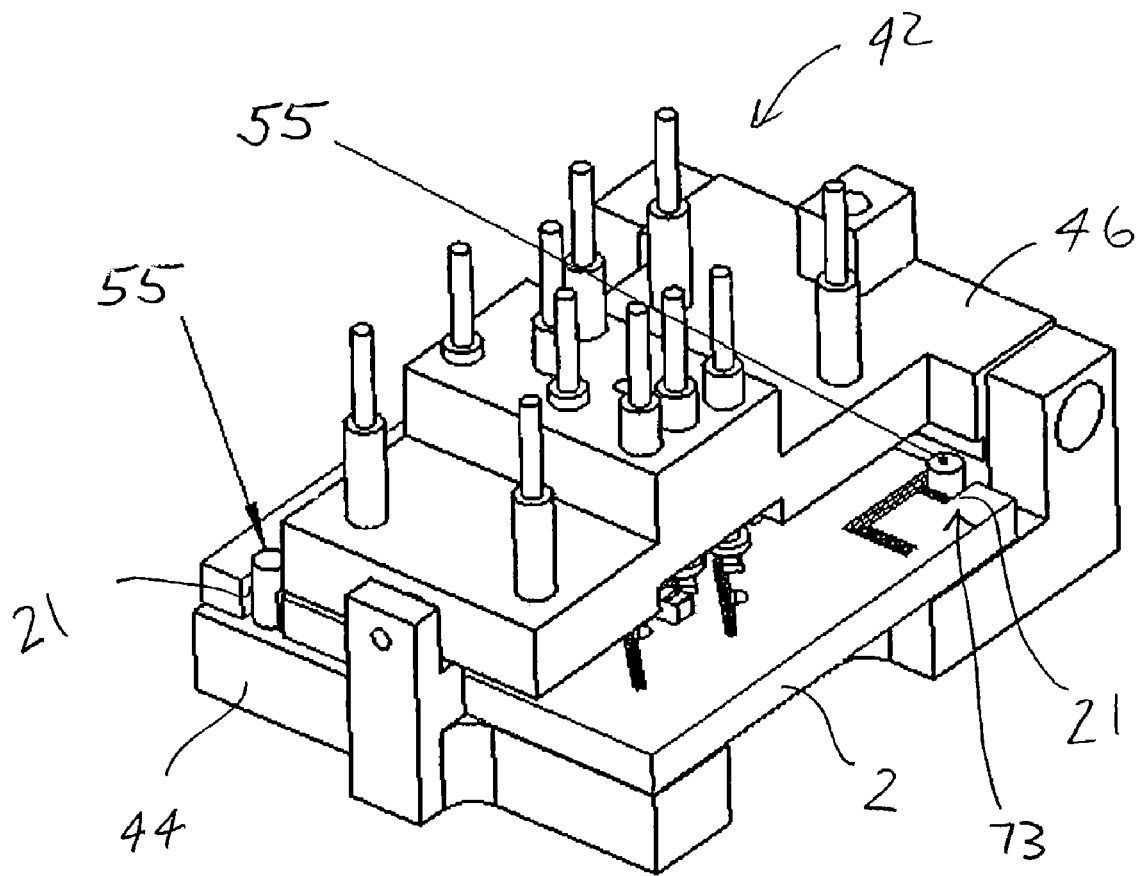
FIG. 9 is a perspective view of another laser component system assembly including another exemplary jig clamp, jig stencil and optical subassembly.
Figure 10:
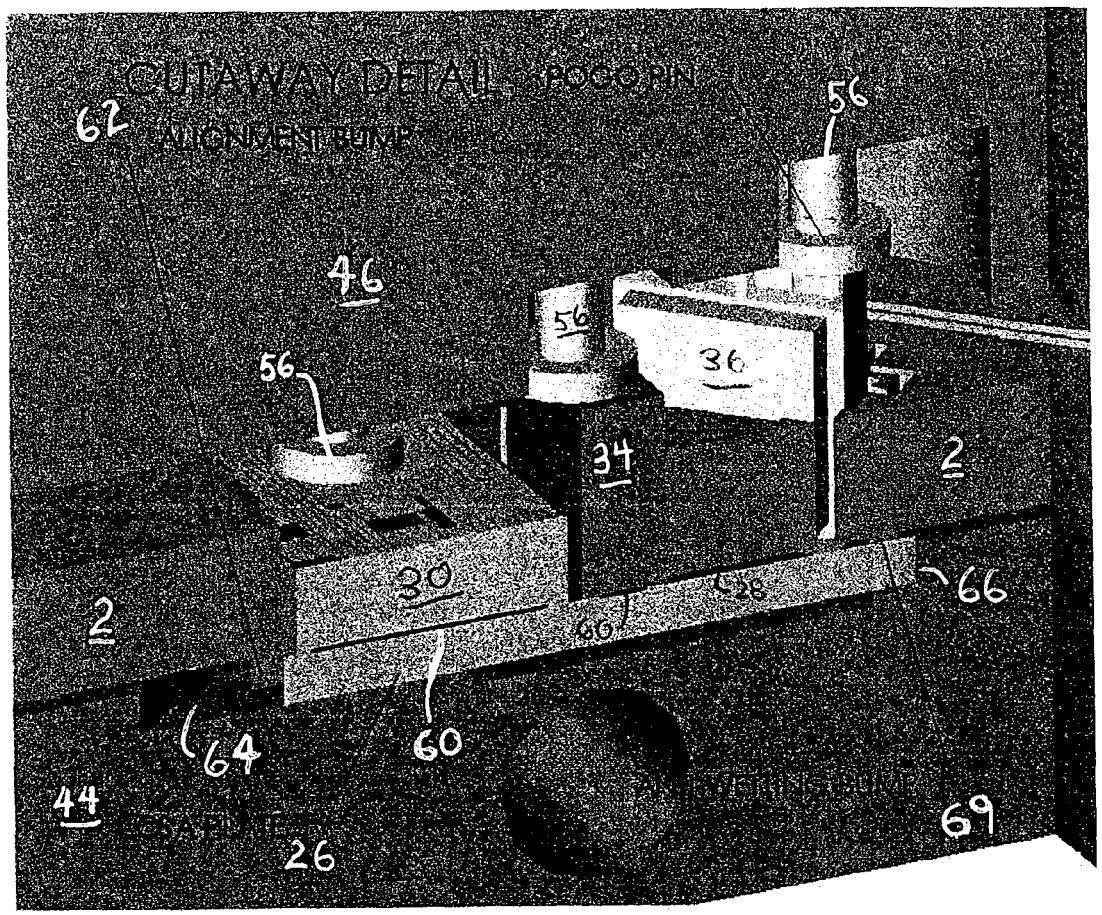
FIG. 10 is a perspective view of a cross-section of an optical subassembly within a jig clamp.

FIG. 9 is a perspective view of another exemplary jig that is in closed position. FIG. 9 shows exemplary jig stencil 2 disposed in jig clamp 42, more particularly, between clamp base 44 and clamp cover 46. FIG. 8 also illustrates an exemplary jig-to-base alignment feature 73. Clamp base 44 includes pins 55 which are protuberances that are received within corresponding openings 21 of jig-to-base alignment features 73 formed peripherally in jig stencil 2. In the exemplary embodiment shown in FIG. 9, clamp base 44 also includes a recessed portion such that jig stencil 2 rests above OSA base 26 (obscured by jig stencil 2 and not visible) so that mechanical stops like standoff bumps 69 illustrated in FIG. 10, are not needed to separate jig stencil 2 from OSA base 26 to prevent solder from wetting jig stencil 2.

As previously shown in FIG. 3, jig stencil 2 includes openings 6 which are precision-size and are positioned with respect to one another according to a tight alignment tolerance. The number, shape, orientation and sizing of openings 6 are customized and each openings 6 is disposed to receive an optical component therein such that the optical components are passively optically aligned with respect to one another such that they satisfy or fall within an acceptably low alignment tolerance, such as within a +/−15 micron, +/−10 micron or +/−5 micron alignment tolerance, and such that they are optically aligned to one another. Stated alternatively, the components are aligned to include a +/−15, +/−10 or +/−5 micron alignment accuracy. The alignment tolerance represents the variation from perfect alignment that is acceptable for device functionality. By optically aligned, it is meant that the light beam emitted by the light source, the laser, is directed through the other optical components to provide an optical output of the OSA. This optical output may be optically coupled to an external optical component such as an optical receiver or an optical transmission medium such as an optical fiber. Stated alternatively, the optical train extends from the light source, through the other optical components and provides the optical output of the OSA. This typically means that the optical components satisfy the prescribed alignment tolerance, which may vary for various OSA's. One aspect of the invention provides that the optical components are optically aligned using passive alignment techniques and only the jig. In another exemplary embodiment, other techniques may be used in conjunction with the passive alignment techniques using the jig.

Before the optical components are positioned with respect to each other by insertion within corresponding openings 6 as shown in FIG. 7, however, a solder layer is formed between the respective optical components and surface 28 of OSA base 26. The solder material is not visible in FIG. 7, 8 or 9, but solder 60 is shown between optical components and surface 28 of OSA base 26 in FIG. 10. The use of the jig arrangement allows many optical component parts to be placed at the same time with the same solder, so that the best solder can be used for all parts, as opposed to the different components being attached using different solders of progressively lower melting points and less ideal solder characteristics. In one exemplary embodiment, gold-tin at approximately 80/20 composition may be used as the solder material. This exemplary solder is advantageously used in telecommunication packages because it wets well, has high shear strength and ages well. In this exemplary embodiment, 80/20 gold-tin may be used as the solder to simultaneously join each of the optical components to OSA base 26. Other solder materials may be used in other exemplary embodiments.

The solder layer may be deposited or mechanically positioned using various well known methods. For example, the solder material may be evaporated onto surface 28 of OSA base 26 or a solder preform may be placed between the optical components and OSA base 26 prior to heating. Other methods may be used in other exemplary embodiments. After the solder material is placed on/over OSA base 26, the optical components including a light source such as a laser, may be positioned within corresponding openings 6 manually or using automated placement equipment, such as various robotics. In the exemplary embodiment illustrated in FIG. 8, optical components 52 represent such exemplary optical components. Jig stencil 2 is preferably positioned to contact OSA plate 26 in a solder-free area such as by using a recessed clamp base such as shown in FIG. 8, or standoff bumps or other mechanical features. An exemplary standoff bump will be shown in FIG. 10.

Returning to FIG. 8, it can be seen that, after the optical components including a light source, are positioned within openings 6 of jig stencil 2, clamp cover 46 may pivot to be positioned over clamp base 44 in the closed position such as shown in FIG. 9. Facing surface 57 of clamp cover 46 and/or pogo pins 56 shown in FIG. 8 may be used to urge the optical components, such as one or more of exemplary optical components 52, toward OSA base 26 to which they are being joined when the jig clamp 42 is closed. In one exemplary embodiment, pogo pins 56 may include a spring mechanism and may resiliently urge the optical components toward OSA base 26, pressing the optical components into contact with OSA base 26, to which they will be joined. In another exemplary embodiment, pogo pins 56 may be rigid, fixed mechanical protuberances.

FIG. 10 is a perspective, cross-sectional view showing a section of the exemplary arrangement of FIG. 8 after clamp cover 46 has been lowered into position over clamp base 44. Pogo pins 56 urge respective optical components 30, 34 and 36 downward toward OSA base 26. Solder 60 is shown between submount 30 and surface 28 of OSA base 26, as well as between collimating lens 34 and surface 28 of OSA base 26. In an exemplary embodiment, the jig system is designed such that jig clamp 42 and jig stencil 2 do not contact any solder 60. Wetting of the solder to the jig stencil 2 is therefore not a concern. Anti-wetting or standoff bump 69, formed on jig stencil 2 in the illustrated embodiment, allows jig stencil 2 to contact the OSA in a solder-fee region and prevents solder from contacting and adhering to jig stencil 2.

FIG. 10 also illustrates recess 64, rib 62, and recessed lip 66, which are helpful in positioning OSA base 26 and jig stencil 2 with respect to each other and jig base 44. After the components are positioned within jig stencil 2 as shown in FIG. 7, and clamped down to contact OSA base 26 as shown in FIG. 8, the assembly is heated to solder the components. The arrangement may be placed in an oven and heated to a reflow temperature to cause solder 60 to reflow and the optical components to be joined to OSA base 26. Forming gas or other suitable soldering environments may be used. According to this method, the various optical components are soldered to OSA base 26 substantially simultaneously and become fixed in position with respect to one another and OSA base 26. For processing efficiency, a plurality of jig clamps, each containing an OSA base and optical components, may be placed within an oven and heated at the same time. The reflow temperature will be determined by the solder used and may range from 120° C. to 400° C. in various exemplary embodiments. After the assembly is heated to the solder reflow temperature, it is cooled. It may be actively cooled using cooled forming gas, nitrogen, or air or it may be allowed to cool in ambient air, forming gas or nitrogen.

An advantage of an aspect of the invention is that the jamming of parts due to thermal mismatch is avoided and the alignment between the components is not compromised. In particular, jig stencil 2 is designed to prevent jamming of the optical component parts during heating and cooling, even if the materials used to form jig stencil 2 and OSA base 26 have significantly different coefficients of thermal expansion (CTE's), i.e., they are thermally mismatched. In an exemplary embodiment, jig stencil 2 may be constructed out of stainless steel which has a CTE of about 11–14 ppm/° C. and OSA base 26 may be formed of aluminum nitride which has a CTE of about 5 ppm/° C. The materials used for the jig stencil and the OSA base and the related CTE's, are intended to be exemplary only, and various other materials with other CTE's may be used. The different CTE's of the base substrate and jig stencil cause the jig stencil and the OSA base to contract at different rates and might otherwise result in the optical components joined to OSA base 26 becoming jammed within jig stencil 2 and misaligned with respect to each other during cooling, if not for the design of the jig stencil according to aspects of the invention.

To address this potential problem, reference surfaces 12 are designed such that, as jig stencil 2 cools down from the reflow temperature and thermally contracts, the entire jig stencil translates rather than the jig stencil interfering with the reflowed assembly. This design allows materials having various CTE's to be used. More particularly, as jig stencil 2 contracts during cooling, reference surfaces 12 move along with jig stencil 2 along direction 20, the "axis of motion" shown in FIG. 3, to slightly disengage reference surfaces 12 from the components within the respective openings 6 along axis of motion direction 20. This action is enabled by the slight retraction of retractable portions 8 and the slight compression of the springs formed by beams 10 to allow movement of the respective opening 6 relative to the fixed optical components joined to the OSA base. In this manner, openings 6 and jig stencil 2 move somewhat with respect to each of the optical components, but the optical components remain fixed with respect to each other and remain within their alignment tolerance, for example within +/−5 or +/−10 microns. The components of jig stencil 2 prevent the aligned optical components from becoming misaligned or jammed into the jig stencil 2 during the heating/cooling process. In other words, the optical components remain optically aligned. The jig stencil does not geometrically obstruct the optical components, but rather allows them to stay within their original alignment positions and therefore satisfy the original alignment tolerance.

Figure 11:
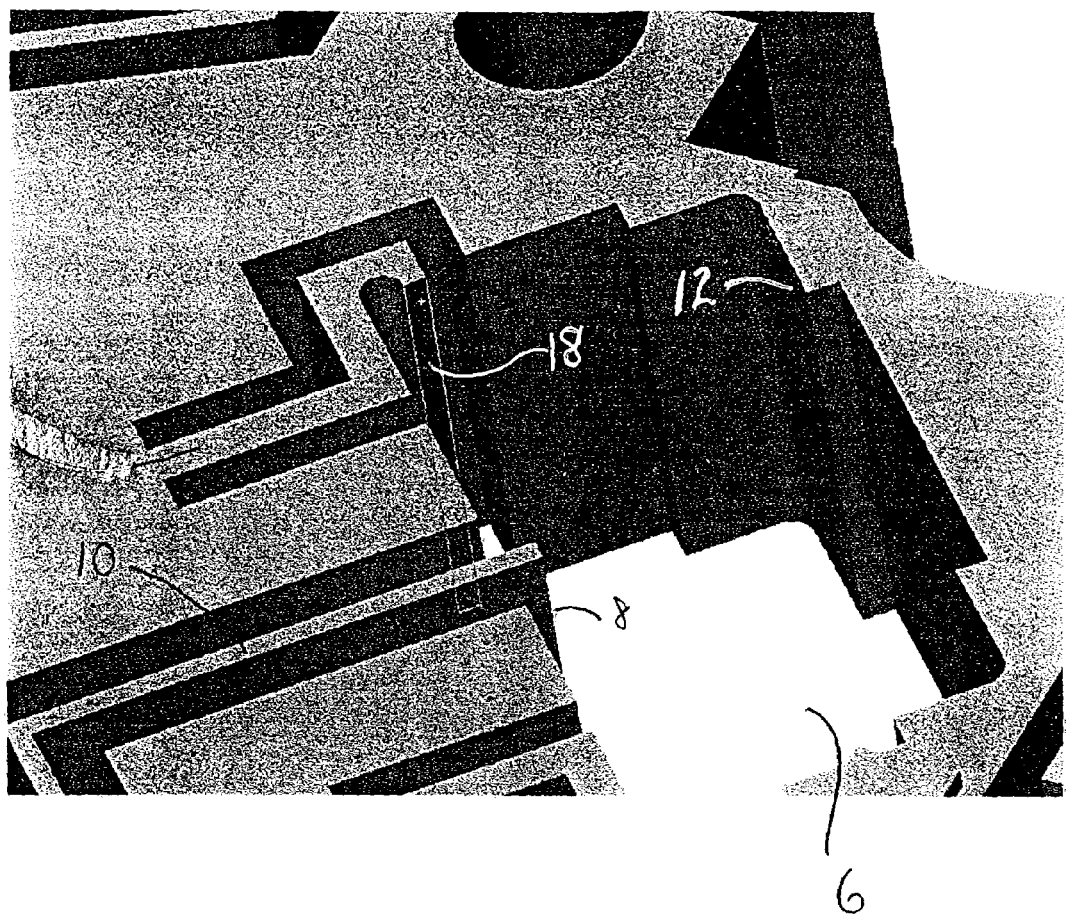
FIG. 11 is a perspective view of an exemplary jig stencil opening for receiving an optical component.

The reference surfaces 12, compliant reference surfaces 18, and retractable portions 8/beams 10 of the previously illustrated exemplary jig stencils, are intended to be exemplary only. In various exemplary embodiments, it may be beneficial to constrain a part in one to three of the three planar degrees of freedom, i.e., two translational degrees of freedom and one rotational degree of freedom. For example, one of the translations may not be fully defined in an exemplary embodiment in which beams 10 are not used. When a surface is used to constrain one of the components, but accuracy is not required in the direction of that constraint, and a solid surface would conflict with the need for anti-jamming geometry, then that surface is designed with limited compliance. In this manner, placement is sufficiently accurate, but the forces generated in the event of interference with the surface, are small enough to prevent jamming. The exemplary jig stencil 2 shown in FIGS. 3 and 5 illustrate this concept. In the exemplary jig stencil shown in FIG. 4, the spring mechanism of beams 10 and retractable surfaces 9, are designed to clamp along one direction while providing a non-definite and compliant constraint in another direction. FIG. 11 illustrates exemplary retractable portion 8, beam 10, compliant reference surface 18, and reference surface 12 in greater detail.

Furthermore, during the cooling process, pins 55 (see FIG. 9) and compliant jig-to-base alignment features 73 allow for slight movement between the jig stencil 2 and jig clamp 42 to relieve stress that could also lead to misalignment.

The passive alignment accomplished using only the jig as described above, produces an optically aligned OSA such as OSA 26 shown in FIG. 6 and which includes accurate alignment. The alignment tolerance is sufficiently tight to enable the subsequent passive alignment of the light source and the OSA to a remote optical element such as an optical receiving member, optical fiber or other optical transmission medium, to form an optical package. The accurate optical alignment obtained using only a jig, also enables the placement of various conventional monitoring and beam optimization devices which are useable without additional alignment procedures. For example, a conventional wavelength locker included in the passively-aligned OSA may be functional without having to actively align the wavelength locker with respect to the optical train. Furthermore, sensors such as quad detectors may also be aligned to the optical beam using the jig and without separate active alignment. Quad detectors are described in U.S. patent application Ser. No. 10/002,703, titled Laser and Fiber Coupling Control, filed on Oct. 30, 2001, the contents of which are hereby incorporated by reference.

The OSA may be joined to an optical fiber, for example, using standard passive alignment techniques, such as by joining the components within a butterfly package. Various mechanical guides and stops may be used to position the OSA with respect to the optical fiber, or various other techniques may be used. Examples of optically coupling such components are described in U.S. patent application Ser. No. 10/002,703, previously incorporated. In other exemplary embodiments, the OSA may be optically coupled to other optical elements, such that the optical output of the OSA is directed to the remote optical element.

Figure 12:
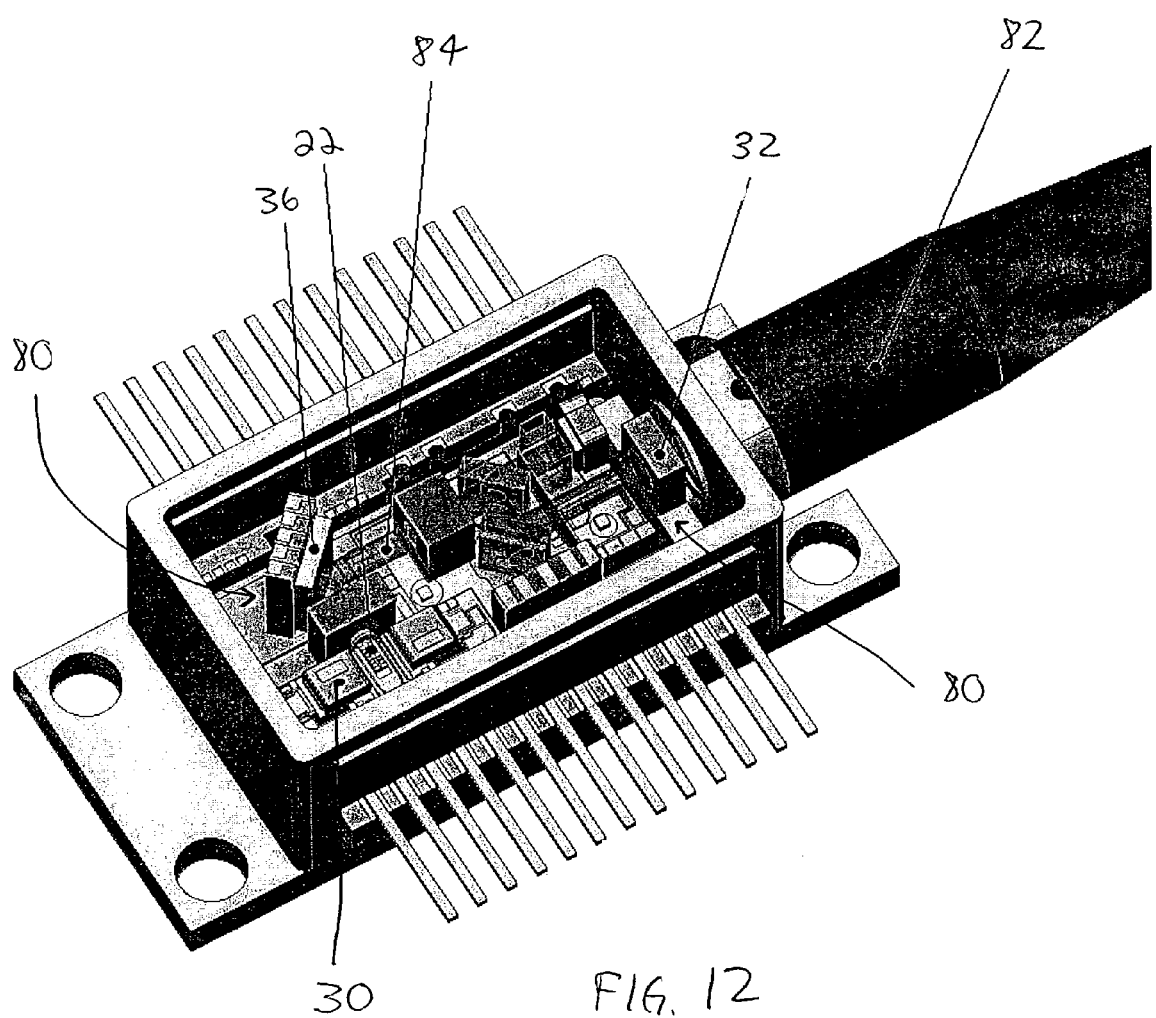
FIG. 12 is a perspective view of an exemplary OSA coupled to optical fiber.

FIG. 12 shows an exemplary OSA 80 of the present invention passively coupled to pigtail-containing optical fiber 82. Optical fiber 82 may be a single mode fiber, for example. OSA 80 includes MEMS 36, submount 30 including laser chip 22, and coupling/focus lens 32. Beam 84, produced by laser chip 22, is also illustrated. The passively aligned optical components of the OSA produce a beam 84 that travels from laser chip 22 to optical fiber 82 and which further can be adjusted by adjusting the MEMS, to maximize the optical power received at the optical fiber.

Such an adjustment may be required due to the inaccuracies of physically joining the passively aligned optical fiber to the OSA, for example. While stops and other mechanical guides may accurately passively align the OSA to the optical fiber to satisfy the alignment tolerances described above, the relative position of the components may be altered when the optical fiber is soldered, welded or otherwise permanently attached to the OSA. When this occurs, a controllable MEMS 36 may then be adjusted to adjust the beam and correct for coupling inaccuracies and to maximize the optical power delivered by beam 84 to optical fiber 82. An exemplary controllable microelectromechanical structure (MEMS) is described in U.S. Provisional Patent Application Ser. No. 60/309,669, titled MEMS mirror filed on Aug. 2, 2001, the contents of which are hereby incorporated by reference. Examples of MEMS alignment and adjustment techniques are also described in U.S. patent application Ser. No. 10/002,703, previously incorporated.

When such an active alignment step is required, aspects of the invention provide that, with a single active alignment step, the amount of light directed to the optical fiber is maximized using a MEMS. This active alignment and adjustment can be carried out using various means, such as a sensor placed at the location of the remote optical element, or a detector positioned to detect light propagating along an optical fiber, for example. U.S. patent application Ser. No. 10/002,703 provides various methods for monitoring and maximizing the optical output of the OSA and therefore the optical power directed to the optical fiber.

In the exemplary embodiment in which a quad detector is used, aspects of the invention provide that the light beam is more accurately directed prior to any adjustment and will accurately be detected by the quad sensor. As such, less voltage is needed to adjust the angles of the MEMS to null out the quad detector as is done to accurately position the light beam.

The same principles described above with respect to a single light source further apply when the OSA includes an array of lasers. The present invention finds particular advantage in passively aligning an array of lasers in an OSA due to the tighter alignment tolerances achievable. When an array of lasers is used in an OSA, the array may include lasers spaced 100 microns apart and is very alignment sensitive. The present invention enables the production of optically aligned OSA's with an array of lasers using passive alignment.

The preceding merely illustrates aspects of the invention. It will thus be appreciated that those skilled in the art will be able to devise various arrangements which, although not explicitly described or shown herein, embody the principles of the invention and are included within its scope and spirit. All examples and conditional language recited herein are exemplary to aid in understanding the principles of the invention, and are to be construed as being without limitation to the scope of the invention. Moreover, all statements herein reciting principles, aspects, and embodiments of the invention, as well as specific examples thereof, are intended to encompass both structural and the functional equivalents thereof. Additionally, it is intended that such equivalents include both currently known equivalents and equivalents developed in the future, i.e., any elements developed that perform the same function, regardless of structure. The scope of the present invention, therefore, is only to be limited by the appended claims and their equivalents.

What is claimed is:

1. A method for optically coupling optical components, comprising:

providing a base substrate;

providing a plurality of optical components including a light source and an adjustable optical element;

forming an optical subassembly by placing said plurality of optical components in a jig stencil positioned over said base substrate, thereby passively aligning said plurality of optical components laterally with respect to one another, and joining, in fixed positions, said plurality of optical components to said base substrate;

passively aligning said optical subassembly to an optical transmission medium; and adjusting said adjustable optical element of said optical subassembly such that optical power of light emitted by said light source and directed into said optical transmission medium, is maximized.

2. The method as in claim 1, in which said jig stencil is generally planar and has a plurality of openings therethrough; and said placing said plurality of optical components in said jig stencil includes positioning said plurality of optical components within said corresponding plurality of openings.

3. The method as in claim 2, in which said positioning includes positioning at least one of said optical components within a corresponding one of said openings and contacting a retractable portion that forms part of a border of said corresponding opening, said retractable portion resiliently urging said at least one of said optical components into alignment position.

4. The method as in claim 3, in which said positioning includes retracting said retractable portion from said opening then inserting said at least one of said optical components within said corresponding opening.

5. The method as in claim 1, in which said adjustable optical element comprises a microelectromechanical structure (MEMS) and said adjusting includes causing said light source to emit light and mechanically adjusting said MEMS.

6. The method as in claim 5, in which said MEMS includes a mirror and said adjusting includes adjusting a position of said mirror.

7. The method as in claim 1, in which said passively aligning includes positioning said optical components to satisfy an alignment tolerance of one of about +/−10 microns and about +/−5 microns.

8. The method as in claim 7, in which said joining includes forming a solder layer between each of said plurality of optical components and said base substrate, and heating to join said optical components to said base substrate such that said plurality of optical elements continues to satisfy said alignment tolerance.

9. The method as in claim 1, in which said passively aligning said optical subassembly to an optical transmission medium, includes the use of at least one mechanical guide.

10. The apparatus as in claim 1, in which at least one of said openings is bounded in part by a fixed reference surface that positions an associated one of said plurality of said optical components within said opening, and is movable with respect to said plurality of optical components that are fixed with respect to each other, during thermal processing.

11. A method for optically coupling optical components, comprising:

providing a base substrate;

providing a plurality of optical components including a light source;

providing a jig;

aligning said plurality of optical components using said jig such that said light source is optically aligned to further of said optical components;

forming a solder layer between each of said plurality of optical components and said base substrate;

joining said optical components to said base substrate such that said light source remains optically aligned to said further of said optical components;

in which said jig includes a corresponding plurality of openings therethrough, said providing includes positioning said jig over said base substrate, and said aligning includes positioning said plurality of optical components within said corresponding plurality of openings;

in which said positioning includes positioning at least one of said optical components within a corresponding one of said openings and contacting a retractable portion that forms part of a border of said corresponding opening, said retractable portion resiliently urging said at least one of said optical components into alignment position; and in which said joining comprises heating and further comprising cooling after said heating, and in which said jig has a thermal coefficient of expansion different from a thermal coefficient of expansion of said base substrate and said retractable portion retracts to allow said jig to move relative to said optical components, during said cooling.

12. A method of optically coupling optical components, comprising:

providing a base substrate;

providing a plurality of optical components including a light source;

providing a jig;

aligning said plurality of optical components using said jig such that said light source is optically aligned to further of said optical components;

forming a solder layer between each of said plurality of optical components and said base substrate;

joining said optical components to said base substrate such that said light source remains optically aligned to said further of said optical components; and in which said joining comprises heating to join said optical components to said base substrate and further comprising subsequently cooling, and said jig moves relative to said optical components thereby preventing said joined optical components from moving with respect to said base substrate, during said step of cooling.

13. A method of optically coupling optical components, comprising:

providing a base substrate;

providing a plurality of optical components including a light source;

providing a jig;

aligning said plurality of optical components using said jig such that said light source is optically aligned to further of said optical components;

forming a solder layer between each of said plurality of optical components and said base substrate;

joining said optical components to said base substrate such that said light source remains optically aligned to said further of said optical components; and further comprising providing a jig clamp having a base section coupled to a movable cover, and in which said providing a base substrate comprises positioning said base substrate on said base section, and further comprising positioning said cover over said plurality of optical components to urge said plurality of optical components toward said base substrate.

14. The method as in claim 13, in which said cover includes at least one protuberance and said positioning said cover includes resiliently urging said plurality of optical components toward said base substrate.

15. The method as in claim 14, in which said joining includes soldering said optical components to said base substrate substantially simultaneously.

16. The method as in claim 13, wherein said base section includes a protuberance and said jig includes an alignment opening bounded by at least one retractable surface and said positioning includes said alignment opening receiving said protuberance therein.

17. An apparatus comprising:

a jig stencil having a plurality of openings that receive a corresponding plurality of optical components therein and passively optically align said plurality of optical components to one another, at least one of said openings bounded by a retractable portion which contacts an associated one of said plurality of said optical components received in said opening; and further comprising a jig clamp for securing said plurality of optical components disposed within said openings, to a base substrate, said jig clamp including a base and cover.

18. The apparatus as in claim 17, in which said base receives said base substrate thereon and said cover is movably coupled to said base.

19. The apparatus as in claim 17, in which said cover includes mechanical protuberances that resiliently urge at least one of said optical components toward said base substrate.

20. The apparatus as in claim 17, wherein said jig stencil further includes an alignment feature that aligns said jig stencil to said base.

21. The apparatus as in claim 20, wherein said base includes a protuberance and said alignment feature comprises a peripheral opening bounded at least partially by a retractable surface, said jig stencil aligned to said base when said protuberance is received within said opening.

22. An apparatus comprising:

an alignment jig, an optical subassembly comprising a plurality of optical components including a light source, and an optical transmission medium, said optical subassembly and said plurality of optical components arranged such that light emitted by said optical source is directed to said optical transmission medium by further of said plurality of optical elements, and said optical subassembly includes alignment tolerances obtainable with said alignment jig;

in which said alignment jig includes a jig stencil including a plurality of openings for receiving said optical components, at least one of said openings bounded in part by a retractable portion; and in which said jig stencil and said base substrate include different coefficients of thermal expansion and said retractable surface portion substantially precludes said optical components from moving with respect to said base substrate when said base substrate and said optical components are heated then cooled.

23. A method of optically coupling optical components, comprising:

providing a base substrate;

providing a plurality of optical components including a light source;

providing a jig;

aligning said plurality of optical components using said jig such that said light source is optically aligned to further of said optical components;

forming a solder layer between each of said plurality of optical components and said base substrate;

joining said optical components to said base substrate such that said light source remains optically aligned to said further of said optical components; and wherein said joining comprises heating said solder layer along with said base, said optical components, and said jig and subsequently cooling said solder layer along with said base, said optical components, and said jig, and said jig moves relative to said optical components thereby preventing said joined optical components from binding to the jig during said cooling.

24. A method for optically coupling optical components, comprising:

providing a base substrate;

providing a plurality of optical components including a light source and an adjustable optical element;

forming an optical subassembly by passively aligning said plurality of optical components using a jig and joining said plurality of optical components to said base substrate;

passively aligning said optical subassembly to an optical transmission medium; and adjusting said adjustable optical element such that optical power of light emitted by said light source and directed into said optical transmission medium is maximized, thereby accounting for imperfections in the passive alignment of said optical subassembly to said optical transmission medium.

25. The apparatus as in claim 24, wherein said jig is fabricated using electron discharge machining.

26. A method forming an optical subassembly optically coupled to an optical fiber, comprising:

placing a metal jig stencil over a base substrate, the metal jig stencil and the base substrate having different coefficients of thermal expansion, the jig stencil having a plurality of holes therethrough, with each hole of the plurality of holes having an optical component therein, with at least one of the holes having a laser therein and at least one other of the holes having an adjustable mirror therein;

joining the optical components to the base substrate in fixed positions to form an optical subassembly;

passively aligning the optical subassembly to an optical fiber; and adjusting the adjustable mirror to maximize the amount of light emitted from the laser reaching the optical fiber.

27. The method of claim 26 wherein joining the optical components to the base substrate comprises heating a solder layer on the base substrate and cooling the solder layer on the base substrate.

28. The method of claim 27 further comprising clamping the base substrate and optical components to urge the optical components towards the base substrate.

* * * * *